US010459851B2

(12) United States Patent
Krten (10) Patent No.: US 10,459,851 B2
(45) Date of Patent: Oct. 29, 2019

(54) METHOD AND APPARATUS FOR EXECUTING A PROCESS ON A DEVICE USING MEMORY PRIVILEGES

(71) Applicant: IRDETO B.V., LS Hoofddorp (NL)

(72) Inventor: Robert Krten, LS Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 0 days.

(21) Appl. No.: 15/510,114

(22) PCT Filed: Sep. 10, 2014

(86) PCT No.: PCT/EP2014/069281
§ 371 (c)(1),
(2) Date: Oct. 24, 2017

(87) PCT Pub. No.: WO2016/037650
PCT Pub. Date: Mar. 17, 2016

(65) Prior Publication Data
US 2018/0165226 A1 Jun. 14, 2018

(51) Int. Cl.
*G06F 12/00* (2006.01)
*G06F 12/14* (2006.01)
*G06F 9/445* (2018.01)
*G06F 9/455* (2018.01)
*G06F 9/50* (2006.01)
*G06F 9/54* (2006.01)

(52) U.S. Cl.
CPC .......... *G06F 12/1491* (2013.01); *G06F 9/445* (2013.01); *G06F 9/4552* (2013.01); *G06F 9/45558* (2013.01); *G06F 9/5016* (2013.01); *G06F 9/545* (2013.01); *G06F 2009/45583* (2013.01)

(58) Field of Classification Search
None
See application file for complete search history.

(56) References Cited

U.S. PATENT DOCUMENTS

| 8,312,249 | B1 | 11/2012 | Trumbull |
| 2006/0047959 | A1 | 3/2006 | Morais |
| 2014/0245444 | A1* | 8/2014 | Lutas .................... G06F 12/109 726/24 |

FOREIGN PATENT DOCUMENTS

WO 2016037650 A1 3/2016

OTHER PUBLICATIONS

Blazakis, Dion "Interpreter Exploitation: Pointer Inference and JIT Spraying" available on http://www.semantiscope.com/research/BHDC2010, 2010, 11 pages.

(Continued)

*Primary Examiner* — Daniel D Tsui
(74) *Attorney, Agent, or Firm* — Rimon PC (57) ABSTRACT

A method and apparatus for executing a process on a device, the device including one or more processors for executing the process and a memory, wherein the process has an associated first type of privilege. The method includes obtaining a portion of the memory for use by the process or for use by a further process being created by the process, wherein the portion of the memory is identified as both writable and executable memory, and wherein the portion of the memory has an associated second type of privilege that is different from the first type of privilege.

30 Claims, 2 Drawing Sheets

(56) References Cited

OTHER PUBLICATIONS

"Understanding JIT spray | HtaS" available on http://blog.cdleary.com/2011/08/understanding-jit-spray/, dated Aug. 29, 2011, 10 pages.
Wikipedia, "JIT spraying" website: https://en.wikipedia.org/w/index.php?title=JIT_spraying&oldid=595124036, obtained on Mar. 27, 2017, 2 pages.
Xu, J. et al., "Transparent Runtime Randomization for Security," Proceedings of the 22nd International Sysmposium on Reliable Distributed Systems (SRDS'03), Oct. 20, 2003, pp. 10.
International Search Report & Written Opinion for International Patent Application No. PCT/EP2014/069281 dated Dec. 18, 2014.

\* cited by examiner

METHOD AND APPARATUS FOR EXECUTING A PROCESS ON A DEVICE USING MEMORY PRIVILEGES

FIELD OF THE INVENTION

This invention relates to methods for executing a process on a device, methods for enabling execution of a process on a device, apparatus for carrying out any such methods and computer programs for carrying out such methods.

BACKGROUND OF THE INVENTION

It is known for attackers to launch attacks against software applications. Such attacks can have very wide reaching and damaging consequences (in terms of financial loss, reputation loss, time loss, data loss and data leakage). Software and system developers are in a permanent struggle with the attackers, whereby the developers try to develop measures to thwart attacks that attackers might launch, and with the attackers trying to develop new attacks that overcome or bypass the measures taken by the developers.

SUMMARY OF THE INVENTION

According to a first aspect of the invention, there is provided a method for executing a process on a device, the device comprising one or more processors for executing the process and a memory, wherein the process has an associated first type of privilege, the method comprising: obtaining a portion of the memory for use by the process or for use by a further process being created by the process, wherein the portion of the memory is identified as both writable and executable memory, wherein the portion of the memory has an associated second type of privilege that is different from the first type of privilege.

In some embodiments, said obtaining is performed at the run time of the process.

In some embodiments, said obtaining comprises requesting a kernel that is executing on the one or more processors to perform a dynamic memory allocation. Said requesting may specify to the kernel the second type of privilege, the kernel then being arranged to allocate said portion of the memory and to associate the specified second type of privilege to the portion of the memory. Alternatively, said requesting may not specify to the kernel the second type of privilege, the kernel then being arranged to allocate said portion of the memory and, if said requesting occurs at the run time of the process, to associate the second type of privilege to the portion of the memory.

In some embodiments, said obtaining is performed as part of a just-in-time compiler compiling code for the process into one or more machine language instructions for the just-in-time compiler to store in the portion of the memory.

According to a second aspect of the invention, there is provided a method for enabling execution of a process on a device, the device comprising one or more processors for executing the process and a memory, wherein the process has an associated first type of privilege, the method comprising: receiving a request for a portion of the memory for use by the process or for use by a further process being created by the process; and in response to the request, providing a portion of the memory that is identified as both writable and executable memory, wherein the portion of the memory has an associated second type of privilege that is different from the first type of privilege.

In some embodiments, said request is received at the run time of the process.

In some embodiments, said request is a dynamic memory allocation request. Said dynamic memory allocation request may specify the second type of privilege.

In some embodiments, said receiving and providing are performed by a kernel that is executing on the one or more processors.

In some embodiments, said request is received from a just-in-time compiler when the just-in-time compiler is compiling code for the process into one or more machine language instructions for the just-in-time compiler to store in the requested portion of the memory.

In some embodiments of the first or second aspects of the invention, the first type of privilege and/or the second type of privilege allows one or more of: (a) opening a file; (b) performing one or more predetermined system calls; (c) reading a file; (d) writing to a file; (e) creating a communications connection.

In some embodiments of the first or second aspects of the invention, the first type of privilege and/or the second type of privilege prohibits one or more of: (a) opening a file; (b) performing one or more predetermined system calls; (c) reading a file; (d) writing to a file; (e) creating a communications connection.

In some embodiments of the first or second aspects of the invention, the second type of privilege is more prohibitive that the first type of privilege.

In some embodiments of the first or second aspects of the invention, the second type of privilege is a predetermined type of privilege. Alternatively, some embodiments of the first or second aspects of the invention comprise determined the second type of privilege based, at least in part, on the first type of privilege.

In some embodiments of the first or second aspects of the invention, execution of the process is performed by a virtual machine running on the one or more processors. Alternatively, execution of the process may be performed by an interpreter running on the one or more processors.

According to a third aspect of the invention, there is provided an apparatus arranged to carry out a method according to any one of the above first and second aspects, or any of their embodiments.

According to a fourth aspect of the invention, there is provided a computer program which, when executed by one or more processors, causes the one or more processors to carry out a method according to any one of the above first and second aspects, or any of their embodiments. The computer program may be stored on a computer-readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
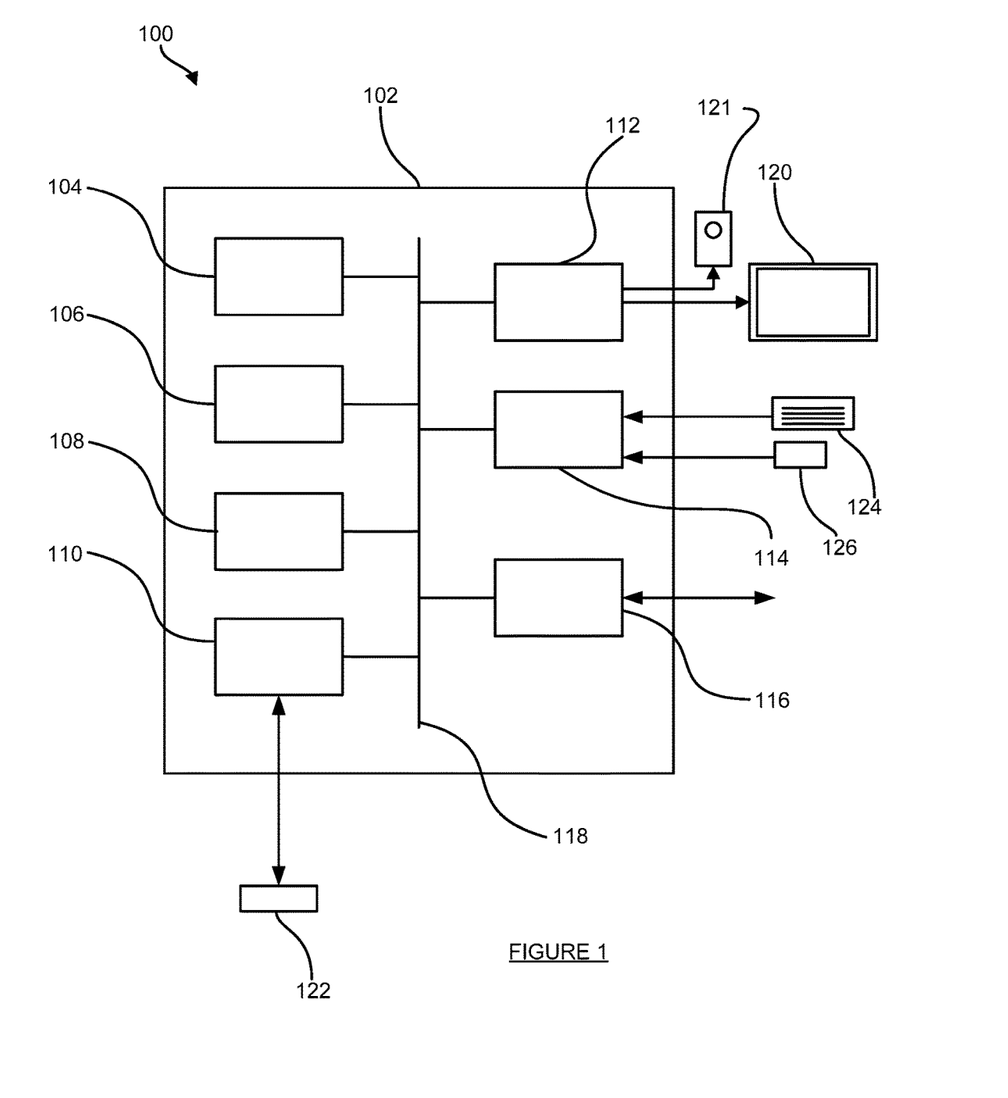
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc.

Figure 2:
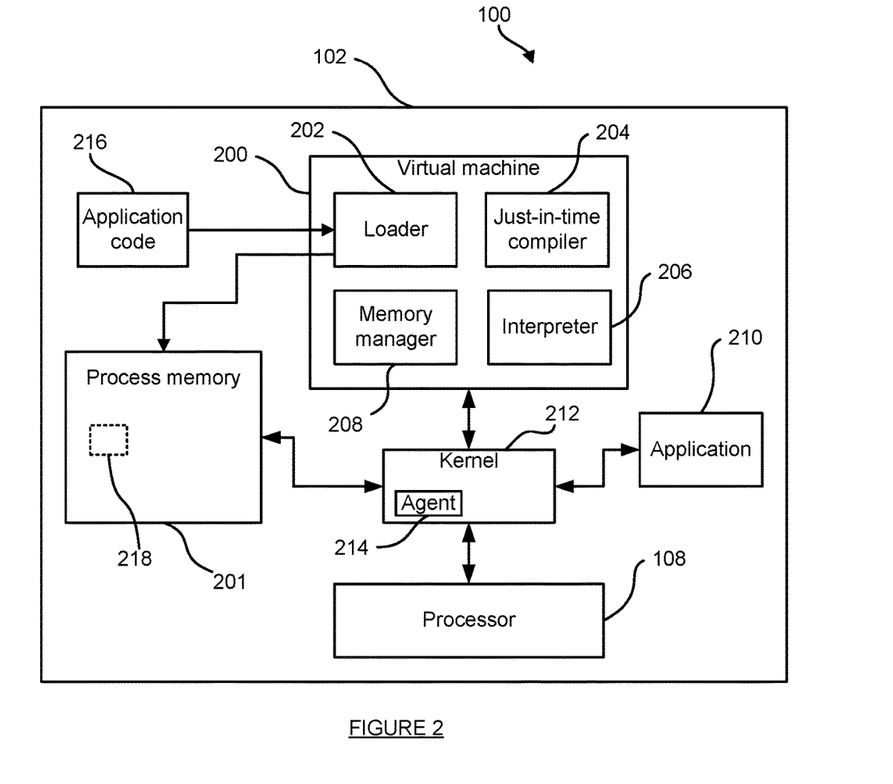
FIG. 2 schematically illustrates an alternative view of the system of FIG. 1 according to some embodiments of the invention.

FIG. 2 schematically illustrates an alternative view of the system 100 of FIG. 1 according to some embodiments of the invention. As shown in FIG. 2, the system 100 of FIG. 2 comprises the one or more processors 108 and process memory 201 (which could be part of the storage medium 104 and/or part of the memory 106 of FIG. 1). The process memory 201 is memory for use by a process when the process is being loaded and executed by the processor 108. The process memory 201 may comprise one or more sections or ranges of the storage medium 104 and/or of the memory 106 of FIG. 1, identifiable by one or more corresponding memory addresses, and may be statically allocated to the process and/or dynamically allocated to the process. It will be appreciated that other components of the system 100 of FIG. 1 are not shown again in FIG. 2 to aid clarity.

The processor 108 is arranged to execute an operating system (such as one of the Windows operating systems, a Linux operating system, an Android operating system, an Apple operating system, etc.). As is known, the operating system provides (or has as a component or module) a kernel 212. The kernel 212 is a computer program executed by the processor 108 that receives and handles/manages system calls from software processes that are being executed by the processor 108. The system calls from a software process may include, for example, a request by the software process to make use of functionality of the processor 108 (such as to create a new process), a memory-related request (such as memory access, memory allocation, memory deallocation), storage-device related requests (such as accessing a disc or other storage medium, file opening/reading/writing/etc.), a request for interaction with a peripheral device coupled to the computer 102, etc. Thus, the kernel 212 effectively provides an interface or connection between a software process and components of the system 100 (such as the processor 108, the memory 106, the storage medium 104, peripheral devices, etc.) whose functionality the software process wishes to use or with which the software process wishes to interact. The kernel 212 may perform various security processing or access control, as is well-known in this field of technology, and may, therefore, execute the system call for the calling software process if the calling software process is entitled to the requested functionality/interaction and, similarly, may decide to not execute the system call for the calling software process if the calling software process is not entitled to the requested functionality/interaction.

It is known to provide kernel agents, such as the agent 214 of FIG. 2—the agent 214 is a computer program that is an extension to, or modifications for, an existing/default/standard kernel 212. Throughout this specification, references shall be made to functionality performed by the kernel 212 (i.e. the handling of system calls)—however, it will be appreciated that such functionality may be performed by one or more kernel agents 214 and/or jointly by the kernel 212 and one or more kernel agents 214. As kernels 212 and kernel agents 214 are well-known, they shall not be described in more detail herein.

Software applications, that are executed as one or more processes by the processor 108, may come in a variety of types. Some software applications are so-called "native" applications—a native software application has been written as code that has then been compiled, linked and bound with a particular target type of machine/computer/platform in mind (such as specifically for the type of computer 102, and/or specifically for the particular type of processor 108, and/or specifically for the particular type of operating system being executed). An example of such a native software application is shown in FIG. 2 as application 210 (although it will be appreciated that not all embodiments of the invention relate to, or involve, such native software applications 210, as shall be apparent from the description below). The processor 108 may execute the application 210 as one or more processes and, as shown in FIG. 2, these one or more processes may interface with (or communicate with or make system calls to) the kernel 212. Examples of native software applications would include, for example, software applications written in C or C++, which have then been compiled, linked and bound to generate one or more corresponding executable files that have machine language instructions (or opcodes) for execution by the processor 108. The executable file(s) (and any associated resources) may be stored, for example, in the storage medium 104 or the memory 106.

One of the problems with such native applications is, of course, that they may not be executable across the multitude of computer/platform types that exist—such as the diverse range of operating systems and computing devices (such as mobile telephones, personal computers, tablet computers, etc.). Previously, one would have needed to write the initial code for the application, potentially make code modifications for specific computer/platform types, and perform the relevant compilation, linking and binding operations to generate specific executable files for a specific computer/platform type. With the proliferation of computer/platform types, such an approach quickly becomes unmanageable for application developers. Consequently, is now possible to produce platform-independent code (such as the code 216 of FIG. 2). Such code 216 may comprise one or more instructions and may, for example, be a program written in JavaScript or a program written in Java that has been compiled into bytecode. The code 216 may be stored, for example, in the storage medium 104 or the memory 106. Such code 216 is then executed as one or more processes via a virtual machine 200. The code 216 may be code for a web application (or web app—i.e. software that runs in a web browser), so that a web browser can execute the code 216 (where the web browser is a software application executed by the processor 108, with the web browser using a virtual machine 200 to enable execution of the web app code 216). It will be appreciated that not all embodiments of the invention relate to, or involve, such code 216 and virtual machines 200, as shall be apparent from the description below.

A virtual machine 200 is a computer program executed by the processor 108. Virtual machines 200 and their components/modules are well-known, and therefore they shall not be described in detail herein except to the extent necessary to understand those embodiments of the invention that make use of virtual machines 200. Typically, the virtual machine 200 comprises a number of modules, including a loader 202, a just-in-time (JIT) compiler 204, an interpreter 206 and a memory manager 208. It will, however, be appreciated that other configurations for a virtual machine 200 are possible, and that the virtual machine 200 illustrated in FIG. 2 is merely an example.

To execute the application code 216 as a process, the loader 202 (or class loader) is responsible for loading code (e.g. bytecode for one or more particular classes and/or data and/or instructions) into the process memory 201—i.e. taking some or all of the code from the application code 216 being stored in the storage medium 104 or the memory 106 and copying that code into the process memory 201 that has been allocated for this process. This is often performed dynamically in an on-demand basis (so that the process memory 201 may grow as necessary). The loader 202 may perform verification and/or authentication processing on the code 216 to be loaded (such as using one or more digital certificates to check one or more digital signatures that have been applied to the code 216).

Once code has been loaded by the loader 202 (i.e. once load time is finished), the code may be executed by the executional functional elements of the virtual machine 200, namely the JIT compiler 204 and/or the interpreter 206 (i.e. at run time). The interpreter 206 may interpret some or all of the instructions in the loaded code in order to execute the loaded code. In contrast the JIT compiler 204 may compile some or all of the instructions in the loaded code into one or more machine language instructions or opcodes (such as ×86 opcodes) for execution by the processor 108. One downside to using the JIT compiler 204 is the overhead or delay in having to perform the compilation of the instructions in the loaded code into one or more machine language instructions; however, once compiled, the machine language instructions can be executed faster than the interpreter 206 is able to interpret the correspond instructions in the loaded code. Additionally, the machine language instructions that result from the compilation by the JIT compiler 204 may be stored in the process memory 201 so that they are available for subsequent execution without having to perform the compilation again. The virtual machine 200 (or the runtime of the virtual machine 200) may decide on which instructions from the loaded code should be interpreted by the interpreter 206 and which should be compiled by the JIT compiler 204 for execution.

Not all virtual machines 200 have a JIT compiler 204 and, even if a virtual machine 200 does have a JIT compiler 204, the virtual machine 200 may decide not to use the JIT compiler 204 when processing one or more particular instructions from the application code 216.

The memory manager 208 helps perform memory management (e.g. dynamic memory allocation and access to data structures) for the virtual machine 200.

The JIT compilation performed by the JIT compiler 204 by definition produces code (namely machine language instructions) as its output data. Naturally, this output data needs to be executable (since the output data is, after all, machine language instructions for execution by the processor 108). Therefore, the machine language instructions produced by the JIT compiler 204 need to be stored in a portion 218 (one or more sections or parts or regions, identifiable by one or more memory addresses) of the process memory 201 that is identified as being both (a) writable (since the JIT compiler 204 needs to write the instructions to this portion 218 of the process memory 201) and (b) executable (since the processor 108 will need to be able to execute the instructions that have been written to this portion 218 of the process memory 201). Consequently, the JIT compilation performed by the JIT compiler 204 is one of the few operations that may be performed that can generate, and store in memory, executable data. In particular, when the JIT compiler 204 wishes to perform JIT compilation on instructions from the loaded code 216, the JIT compiler 204 issues a request to be allocated a portion of the process memory 201 to which the JIT compiler 204 can write the machine language instructions that it is about to generate (or has just generated). The virtual machine 200 handles this request (possibly via the memory manager 208) by issuing a system call to the kernel 212. In response to that system call, the kernel 212 will allocate a portion 218 of the process memory 201 to the virtual machine 200, and will respond to the system call by providing the virtual machine 200 with a memory address for the allocated portion 218 of the process memory 201. The portion 218 of the process memory 201 is identified by the kernel 212 as being writable and executable—methods for setting and storing the write/executable status of a portion of memory are well-known. The portion 218 may comprise one or more sections of already existing (but unallocated) process memory 201; additionally or alternatively the kernel 212 may expand/grow the process memory 201 in response to the system call so as to obtain more memory, some or all of the additional memory being used for the portion 218.

So-called JIT spray attacks are well-known. With JIT spray attacks, an attacker attempts to change the program execution location/address to an address within a portion 218 of the process memory 201 that has been used to store the machine language instructions generated by the JIT compiler 204. Additionally, or alternatively, the attacker attempts to introduce new machine language instructions into, or replace existing machine language instructions with alternative machine language instructions in, the portion 218 of the process memory 201 that has been used to store the machine language instructions generated by the JIT compiler 204. As the portion 218 of the process memory 201 is both writable and executable, the attacker can change the process execution. JIT spray attacks are very well known— see, for example: http://en.wikipedia.org/wiki/JIT_spraying; "Interpreter Exploitation: Pointer Interference and JIT spraying", by Dion Blazakis, (http://www.semantiscope .com/research/BHDC2010/BHDC-2010-Paper.pdf); and "Understanding JIT spray", by Chris Leary, http:// blog.cdleary.com/2011/08/understanding-jit-spray/(the entire contents of these being incorporated herein by reference). Embodiments of the invention may help mitigate, or reduce the impact or effect of, JIT spray attacks.

It will be appreciated that attackers may launch other types of attack, wherein those other types of attack may try to make use of data in a writable and executable portion of the process memory 201.

As is known, a process will have its own "type" or level of privilege (which may be viewed as a collection or set of one or more individual privileges and/or rights and/or restrictions and/or permissions). The type of privilege may comprise one or more particular numbers or other identifiers to which certain entitlements and/or restrictions are associated or correspond, or the type of privilege may be an explicit list or set of entitlements and/or restrictions and/or indications of such entitlements and/or restrictions. The type of privilege for a process may, for example, indicate that the process is allowed or permitted to perform (via the kernel 212) one or more of (a) opening a file; (b) performing one or more predetermined system calls; (c) reading a file; (d) writing to a file; (e) creating a communications connection (such as a TCP/IP connection). Similarly, the type of privilege for a process may, for example, indicate that the process is prohibited or denied from performing (via the kernel 212) one or more of (a) opening a file; (b) performing one or more predetermined system calls; (c) reading a file; (d) writing to a file; (e) creating a communications connection (such as a TCP/IP connection). Each process has its own associated process identification (e.g. a process number or name) which is set (usually by the kernel 212) when the process is created. The kernel 212 may associate a type of privilege with a process and store this association (for example, in a table accessible by the kernel 212, in which process identifications are stored in association with an indication of the corresponding type of privilege). In this way, the kernel 212, upon receiving a system call from a process, can determine the type of privilege associated with the calling process (by looking up, in the table, the privilege type associated with the identification of the calling process) and, based on the determined type of privilege, decide whether or not (or the manner in which) the system call should be executed.

Current kernels 212 (such as the Linux Kernel with its Linux Security Module) apply security at the "process level". In particular, the above-mentioned privilege type for a process applies to the whole process. Therefore, the contents of the writable and executable portion 218 of the process memory 201 will have the same privilege type as loaded application code (such as code 216 for the process that is being interpreted by the interpreter 206). Consequently, machine language instructions being stored in the portion 218 of the process memory 201 can execute with the same type of privilege as the other application code for the process. Thus, if an attacker launches an attack that uses the data in the portion 218 of the process memory 201, the attacker's attack can operate with the same privilege type (or at the same privilege level) as the privilege type (or level) initially intended for the legitimate/un-attacked process.

As an example of how a process's privilege may work, the kernel 212 may have (or may store) an array or list of data structures, where each data structure corresponds to a respective process and contains information about that process. Among the pieces of data stored about the process in its data structure may be a "user ID" and/or a "group ID" associated with the user and/or the group respectively that created the process (or who was logged in when the process was created). In a typical Linux system, for example, the kernel 212 has a set of tables that specify what actions processes with a given associated "user ID" are allowed to do, and what actions processes with a given associated "group ID" are allowed to do (although it will be appreciated that, additionally or alternatively, kernels 212 could store, in such tables, data that specifies what actions processes with a given associated "user ID" are not allowed to do, and/or what actions processes with a given associated "group ID" are not allowed to do). These actions may include one or more system calls of various types (discussed above). These actions could include, for example, a set of permissions on a file. For example, a certain file may be marked as "readable and writable by owner, readable by group, and no access by anyone else"—suppose that file is owned by user ID "A" with a group ID of "B", then: (a) when a process that has a user ID of "A" requests to access the file, it is allowed to read and write to the file; (b) when a process that has a user ID different from "A" but has group ID of "B" requests to access the file, then it would only be allowed to read the file, i.e. it would not be allowed to write to the file; and (c) when a process that has a user ID of "J" and a group ID of "K" requests to access the file, it would not be permitted access to the file, because neither of its user ID nor group ID matches the user ID or group ID of the file, and the permissions for "anyone else" are "no access". Under Linux, various devices (e.g., hard disks, keyboards, frame buffers), are treated as if they were "files" and are assigned permissions for "user", "group", and "other".

One or more individual privileges for a process may also be set, at least in part, by the code (e.g. the application code 210 or 216) itself. Use/enforcement of such a privilege may be functionality implemented by a standard kernel 212 or as bespoke functionality on top of a standard kernel 212, for example via a kernel agent 214. The kernel 212 (or kernel agent 214) is arranged to compare the privileges (as specified to the kernel 212 or the kernel agent 214) by the code 210, 216 associated with the process against the operation being contemplated (i.e. as specified/requested in a system call). As part of loading the code 210, 216, the kernel 212 or the kernel agent 214 may store, in a table associated with the resulting process, a list of privileges specified by that code 210, 216 for the resulting process. As an example, the kernel 212 or the kernel agent 214 may be arranged, upon receiving a system call from a process in which the process requests the execution/creation of another process, to check whether the calling process has privilege/permission to execute/create another process. If the calling process's code/executable 210, 216 specified a privilege that indicates that "this process can execute/create other processes", then the kernel 212 or the kernel agent 214 will allow that system call (and will therefore carry it out); on the other hand, if the calling process's code/executable 210, 216 does not specify a privilege that indicates that "this process can execute/create other processes", or positively specifies a privilege that indicates that "this process cannot execute/create other processes", then the kernel 212 or the kernel agent 214 will deny that system call (and will therefore not carry it out).

Therefore, with some embodiments of the invention, a process may be executed by the processor 108 of the computer 102 as described above. This process may result, for example, from the processor 108 executing the native application 210 and/or from using the virtual machine 200 to execute the non-native application code 216. The process has an associated first type of privilege. This first type of privilege may be determined/set/specified via one or more of the above-mentioned techniques (and/or via any other known techniques). Some embodiments of the invention provide a method that comprises obtaining a portion of memory (e.g. a portion 218 of the process memory 201) for use by the process, wherein this portion of the memory is identified as both writable and executable memory, wherein the portion of the memory has an associated second type of privilege that is different from the first type of privilege.

Similarly, to enable such a process to be execute by the processor 108 of the computer 102, some embodiments of the invention provide a method that comprises: receiving a request for a portion of the memory (e.g. a portion 218 of the process memory 201) for use by the process; and in response to the request, providing a portion of the memory that is identified as both writable and executable memory, wherein the portion of the memory has an associated second type of privilege that is different from the first type of privilege.

Examples of these embodiments of the invention are set out below. It will be appreciated, however, that these examples are provided merely to assist in understanding embodiments of the invention, and that other embodiments of the invention may work in different ways from the examples below.

Example 1

As a first example, at run time, the virtual machine 200 may be using its JIT compiler 204 to perform JIT compilation of some or all of the loaded application code 216. For this compilation, the JIT compiler 204 may be arranged to make a system call (potentially via the memory manager 208) to the kernel 212 to request a portion of the memory (e.g. a portion 218 of the process memory 201) for use by the process (where the process corresponds to the loaded code 216). This request may be generated, for example, as part of the JIT compiler 204 compiling some or all of the code 216 for the process into one or more machine language instructions that the JIT compiler 204 wishes to store in the requested portion of the memory. This request is, therefore, a request for a writable and executable portion 218 of the process memory 201 to be allocated. Such a request is, therefore, a dynamic memory allocation request. It will be appreciated, of course, that the JIT compiler 204 may make other dynamic memory allocation requests, not all of which are for writable and executable portions of the process memory 201, and that the JIT compiler 204 may make dynamic memory allocation requests for writable and executable portions of the process memory 201 for other reasons too.

The kernel 212, upon receiving a system call based on the request for the portion of memory, may be arranged to allocate to the process a portion 218 of the process memory 201 and return to the virtual machine 200 (or the JIT compiler 204) an address for the allocated memory. Given the nature of the system call (i.e. the system call is a request for a writable and executable portion of memory), the portion 218 of the process memory 201 that is allocated is a portion that is identified as being a writable and executable portion of memory. In particular, there may be a part of the process memory 201 that the kernel 212 has previously identified as being writable and executable memory, so that the kernel 212 then selects a currently-unallocated portion of this already identified writable and executable memory to be allocated in response to the received request. Alternatively, in response to the request, the kernel 212 may allocate a currently-unallocated portion of the process memory 201 and set that portion of memory to be identified as writable and executable. As mentioned above, the dynamic memory allocation may involve growing or expanding the existing process memory 201 so that additional memory is available to satisfy the request.

In this way, the JIT compiler 204 (or the virtual machine 200) may obtain (or receive or have allocated/provided) the portion 218 of memory (by virtue of having issued the request and received the address for the portion 218 of memory). Similarly, in this way, the kernel 212 may provide the portion 218 of memory to (or allocate the portion 218 of memory to, or identify the portion 218 of memory to, or designate the portion 218 of memory for use by) the process (by virtue of having received the request and provided the address of the portion 218 of memory that the kernel 212 allocates to the process).

In this example, the kernel 212 is arranged so that, upon receiving a system call, or request, for allocation of writable and executable memory at run time, the kernel 212 will set the privilege of the allocated portion of process memory 201 to have a second type of privilege, different from the first type of privilege. If the kernel 212 were to have received a system call, or request, for allocation of writable and executable memory not at run time (for example, at load time when the loader 202 is loading code into the process memory 201, so that the loader 202 needs a portion of writable and executable memory from the process memory 201 into which it can load some or all of the code 216), the kernel 212 may be arranged to allocate a portion of writable and executable memory from the process memory 201 with the first type of privilege.

Here, the second type of privilege may be a predetermined type of privilege. Alternatively, the kernel 212 may be arranged to specify, or set, the second type of privilege based on the first type of privilege for the process, for example, by setting the second type of privilege equal to the first type of privilege but with one or more specific permissions or privileges removed and/or with one or more specific restrictions added, to thereby limit or refine the first type of privilege (and thereby help safeguard, or help prevent misuse of, the allocated portion 218 of the process memory 201).

Example 2

As a second example, the JIT compiler 204 of the virtual machine 200 may be arranged to make a system call (potentially via the memory manager 208) to the kernel 212 to request a portion of the memory (e.g. a portion 218 of the process memory 201) for use by the process (where the process corresponds to the loaded code 216). This request may be generated, for example, as part of the JIT compiler 204 compiling some or all of the code 216 for the process into one or more machine language instructions that the JIT compiler 204 wishes to store in the requested portion of the memory. This request is, therefore, a request for a writable and executable portion 218 of the process memory 201 to be allocated. Such a request is, therefore, a dynamic memory allocation request. It will be appreciated, of course, that the JIT compiler 204 may make other dynamic memory allocation requests, not all of which are for writable and executable portions of the process memory 201, and that the JIT compiler 204 may make dynamic memory allocation requests for writable and executable portions of the process memory 201 for other reasons too.

In this example, the JIT compiler 204 is arranged so that the request for allocation of writable and executable memory itself identifies a second type of privilege, different to the first type of privilege. This is different from Example 1 above, in which the request from the JIT compiler 204 did not identify the second type of privilege.

For example, in the C programming language a request for allocation of memory may be made by calling the malloc function from the stdlib library (e. g. ptr=malloc (num), which causes the kernel 212 to allocate a portion of memory of size num bytes, with the variable ptr being set to the malloc's return value that is a pointer to the dynamically allocated portion of memory). Some embodiments of the invention may make use of a new version of the malloc function (referred to below as malloc_new) that has an additional parameter that indicates the privilege type for the memory to be allocated (e.g. ptr=malloc_new (num, priv), which causes the kernel 212 to allocate a portion of memory of size num bytes and that has privilege type indicated by the value of priv, with the variable ptr being set to the malloc_new's return value that is a pointer to the dynamically allocated portion of memory). The JIT compiler 204 and the kernel 212 may have been written so as to use the new version of the malloc function, i.e. malloc_new. If the value of priv is not specified, then the kernel 212 may assume that priv assumes a value corresponding to the first type of privilege. The same could be performed, for example, with the new function in C++ or analogous memory allocation functions in different languages.

The kernel 212, upon receiving a system call based on the request for the portion of memory, may be arranged to allocate to the process a portion 218 of the process memory 201 and return to the virtual machine 200 (or the JIT compiler 204) an address for the allocated memory. Given the nature of the system call (i.e. the system call is a request for a writable and executable portion of memory), the portion 218 of the process memory 201 that is allocated is a portion that is identified as being a writable and executable portion of memory. In particular, there may be a part of the process memory 201 that the kernel 212 has previously identified as being writable and executable memory, so that the kernel 212 then selects a currently-unallocated portion of this already identified writable and executable memory to be allocated in response to the received request. Alternatively, in response to the request, the kernel 212 may allocate a currently-unallocated portion of the process memory 201 and set that portion of memory to be identified as writable and executable. As mentioned above, the dynamic memory allocation may involve growing or expanding the existing process memory 201 so that additional memory is available to satisfy the request.

In this way, the JIT compiler 204 (or the virtual machine 200) may obtain (or receive or have allocated/provided) the portion 218 of memory (by virtue of having issued the request and received the address for the portion 218 of memory). Similarly, in this way, the kernel 212 may provide the portion 218 of memory to (or allocate the portion 218 of memory to, or identify the portion 218 of memory to, or designate the portion 218 of memory for use by) the process (by virtue of having received the request and provided the address of the portion 218 of memory that the kernel 212 allocates to the process).

In this example, the kernel 212 is arranged so that, upon receiving the request for writable and executable memory, the kernel 212 will set the privilege of the allocated portion of process memory 201 to have a second type of privilege that is identified in the received request.

Here, the second type of privilege may be a predetermined type of privilege. Alternatively, the JIT compiler 204 may be arranged to specify, or set, the second type of privilege based on the first type of privilege for the process, for example, by setting the second type of privilege equal to the first type of privilege but with one or more specific permissions or privileges removed and/or with one or more specific restrictions added, to thereby limit or refine the first type of privilege (and thereby help safeguard, or help prevent misuse of, the allocated portion 218 of the process memory 201).

In Example 2, a bespoke JIT compiler 204 is required (i.e. one that is arranged to issue requests for portions of writable and executable memory, where such requests identify the second privilege type) as well as a bespoke kernel 212 (or kernel agent 214) (i.e. one that is arranged to receive, and process, requests for portions of writable and executable memory, where such requests may identify the second privilege type). In contrast, Example 1 does not require a bespoke JIT compiler 204—instead, Example 1 requires a bespoke kernel 212 (or kernel agent 214) (i.e. one that is arranged to receive, and process, requests for portions of writable and executable memory, where such requests do not identify the second type of privilege, and to handle such requests as set out above). Example 1 therefore works with existing/legacy virtual machines 200 and their JIT compilers 204; in contrast, Example 2 may provide more flexibility as different JIT compilers 204 may be written, which enables them to set the second privilege type in different ways.

Example 3

As a third example, the system 100 may be arranged so that:

(1) A system call from (or made by) a process for the virtual machine 200 (or any of its components) that is made to the kernel 212 during load time for the process (i.e. before run time for the process, when the loader 202 is loading some or all of the application code 216), to request a writable and executable portion 218 of the memory (e.g. a portion 218 of the process memory 201) for use by the process is handled so that the resulting allocated memory has, as its associated type of privilege, the first privilege type; and (2) A system call from (or made by) a process for the virtual machine 200 (or any of its components) that is made to the kernel 212 during run time for the process to request a writable and executable portion 218 of the memory (e.g. a portion 218 of the process memory 201) for use by the process is handled so that the resulting allocated memory has, as its associated type of privilege, a second privilege type different from the first type of privilege.

The obtaining and provision of portions of memory may be achieved in a manner analogous to the examples set out in Example 1 and/or Example 2 above. For example:

(i) The request for allocation of the writable and executable portion 218 of the memory may not specify the second privilege type (in the same way as for Example 1). In this case, the kernel 212 is arranged so that, upon receiving a system call, or request, for allocation of writable and executable memory at run time, the kernel 212 will set the privilege of the allocated portion of process memory 201 to have a second type of privilege, different from the first type of privilege. If the kernel 212 were to have received a system call, or request, for allocation of writable and executable memory not at run time (for example, at load time when the loader 202 is loading code into the process memory 201, so that the loader 202 needs a portion of writable and executable memory from the process memory 201 into which it can load some or all of the code 216), the kernel 212 may be arranged to allocate a portion of writable and executable memory from the process memory 201 with the first type of privilege. As with Example 1, the second type of privilege may be a predetermined type of privilege. Alternatively, the kernel 212 may be arranged to specify, or set, the second type of privilege based on the first type of privilege for the process, for example, by setting the second type of privilege equal to the first type of privilege but with one or more specific permissions or privileges removed and/or with one or more specific restrictions added, to thereby limit or refine the first type of privilege (and thereby help safeguard, or help prevent misuse of, the allocated portion 218 of the process memory 201).

(ii) The request for allocation of the writable and executable portion 218 of the memory may specify the second privilege type (in the same way as for Example 2). This may be achieved in the same way as set out above for Example 2. In this case, the kernel 212 is arranged so that, upon receiving the request for writable and executable memory, the kernel 212 will set the privilege of the allocated portion of process memory 201 to have a second type of privilege that is identified in the received request. In this way, for example, the memory manager 208 of the virtual machine 200 may be arranged so that it issues memory allocation requests on behalf of components of the virtual machines 200 as follows: (a) any request for dynamic allocation of writable and executable memory by the loader 202 is for memory with the first privilege type, whereas (b) any request for dynamic allocation of writable and executable memory by the JIT compiler 204 and/or the interpreter 206 is for memory with a second privilege type different from the first privilege type. Here, the second type of privilege may be a predetermined type of privilege. Alternatively, the virtual machine 200 (or the relevant calling component of the virtual machine 200) may be arranged to specify, or set, the second type of privilege based on the first type of privilege for the process, for example, by setting the second type of privilege equal to the first type of privilege but with one or more specific permissions or privileges removed and/or with one or more specific restrictions added, to thereby limit or refine the first type of privilege (and thereby help safeguard, or help prevent misuse of, the allocated portion 218 of the process memory 201).

As with Examples 1 and 2 above, in Example 3(ii) above, a bespoke virtual machine 200 is required (i.e. one that is arranged to issue requests for portions of writable and executable memory, where such requests identify the second privilege type) as well as a bespoke kernel 212 (or kernel agent 214) (i.e. one that is arranged to receive, and process, requests for portions of writable and executable memory, where such requests may identify the second privilege type). In contrast, Example 3(i) does not require a bespoke virtual machine 200—instead, Example 3(i) requires a bespoke kernel 212 (or kernel agent 214) (i.e. one that is arranged to receive, and process, requests for portions of writable and executable memory, where such requests do not identify the second type of privilege, and to handle such requests as set out above). Example 3(i) therefore works with existing/legacy virtual machines 200; in contrast, Example 3(ii) may provide more flexibility as different virtual machines 200 (or their components) may be written, which enables them to set the second privilege type in different ways.

Example 4

As a fourth example, the system 100 may be arranged so that:

(1) A system call from (or made by) a process for executing the native application 210 that is made to the kernel 212 during load time for the process (i.e. before run time for the process), to request a writable and executable portion 218 of the memory (e.g. a portion 218 of the process memory 201) for use by the process is handled so that the resulting allocated memory has, as its associated type of privilege, the first privilege type.

(2) A system call from (or made by) a process for executing the native application 210 that is made to the kernel 212 during run time for the process to request a writable and executable portion 218 of the memory (e.g. a portion 218 of the process memory 201) for use by the process is handled so that the resulting allocated memory has, as its associated type of privilege, a second privilege type different from the first type of privilege.

This example is analogous to, and may be implemented in the same ways, as Example 3 above. Indeed, Example 3 may be viewed as a specific case of Example 4 in which the native application 210 is an application that executes a virtual machine 200.

The above examples and description have referred to the portion 218 of the process memory 201 being allocated, where this portion 218 is for use by the process. However, in some embodiments of the invention, the portion of memory that is to be allocated is not for use by the process itself. Instead, in some embodiments, a process may make a system call to the kernel 212 to create a new process. In this case, the new process will have its own process memory allocated. In some embodiments, the kernel 212 is arranged so that, upon receipt of a system call, or a request, to create a new process, the process memory allocated to the newly created process has an associated privilege of a second privilege type that is different from the privilege type for the calling process. This process memory for the new process may be obtained and provided in an analogous manner to Examples 1 and 2 above. In particular:

(i) The request to create a new process may not specify the second privilege type (in the same way as for Example 1). In this case, the kernel 212 is arranged so that, upon receiving a system call, or request, at run time from an already-executing process to create a new process, the kernel 212 will set the privilege type of the process memory for the newly created process to have a second type of privilege, different from the first type of privilege. As with Example 1, the second type of privilege may be a predetermined type of privilege. Alternatively, the kernel 212 may be arranged to specify, or set, the second type of privilege based on the first type of privilege for the process, for example, by setting the second type of privilege equal to the first type of privilege but with one or more specific permissions or privileges removed and/or with one or more specific restrictions added, to thereby limit or refine the first type of privilege (and thereby help safeguard, or help prevent misuse of, the allocated process memory for the newly created process).

(ii) The request create a new process may specify the second privilege type (in the same way as for Example 2). This may be achieved in the same way as set out above for Example 2. In this case, the kernel 212 is arranged so that, upon receiving a system call, or request, at run time from an already-executing process to create a new process, the kernel 212 will set the privilege of the process memory for the newly created process to have a second type of privilege that is identified in the received request. Here, the second type of privilege may be a predetermined type of privilege. Alternatively, the calling process may be arranged to specify, or set, the second type of privilege based on the first type of privilege for the process, for example, by setting the second type of privilege equal to the first type of privilege but with one or more specific permissions or privileges removed and/or with one or more specific restrictions added, to thereby limit or refine the first type of privilege (and thereby help safeguard, or help prevent misuse of, the process memory for the newly created process).

As mentioned above, current kernels 212 (such as the Linux Kernel with its Linux Security Module) apply security at the "process level". In particular, in current systems, the privilege type for a process applies to the whole process. In contrast, embodiments of the invention enable much more refined privilege control, so that executable memory may have different privileges from the main "first" privilege type of the process. This can help mitigate the consequences of an attack that an attacker may have launched, potentially rendering some attacks completely ineffective. For example:

(a) The first privilege type for a process may have allowed the process to open and read a file. If the second type of privilege associated with an executable portion of memory were to prohibit instructions in that portion of memory from opening and reading a file, then an attacker cannot use data in that portion of memory to launch an attack that involved opening and reading a file (and, therefore, the attack cannot access sensitive data in a file that the calling process may have otherwise been able to access).

(b) The first privilege type for a process may have allowed the process to write to a file. If the second type of privilege associated with an executable portion of memory were to prohibit instructions in that portion of memory from writing to a file, then an attacker cannot use data in that portion of memory to launch an attack that involves writing to a file (and, therefore, the attack cannot overwrite or delete data in a file that the calling process may have otherwise been able to overwrite or delete).

(c) The first privilege type for a process may have allowed the process to open a communications link with another computer (e.g. a TCP/IP connection). If the second type of privilege associated with an executable portion of memory were to prohibit instructions in that portion of memory from opening a communications link with another computer, then an attacker cannot use data in that portion of memory to launch an attack that involves opening a communications link with another computer (and, therefore, the attack cannot access data from the computer 102 that is executing the process and transfer that data to another computer).

(d) The first privilege type for a process may have allowed the process to create a new process. If the second type of privilege associated with an executable portion of memory were to prohibit instructions in that portion of memory from creating a new process, then an attacker cannot use data in that portion of memory to launch an attack that involves creating a new process (and, therefore, the attack cannot start a new process as a "secret background" process for malicious purposes). Alternatively, if a system call to create a new process is made, the second type of privilege may be used so that the process memory for the new process has a second type of privilege that restricts certain system calls (such as in examples (a)-(c) above)—in this case, an attacker's ability to launch an attack by using data in the process memory for that new process is more limited (as set out in examples (a)-(c) above).

The second type of privilege may be set or specified, at least in part, by the code (e.g. the application code 210 or 216) itself. Use/enforcement of such a privilege may be functionality implemented by a standard kernel 212 or as bespoke functionality on top of a standard kernel 212, for example via a kernel agent 214. In such embodiments, the kernel 212 (or kernel agent 214) is arranged to compare the privileges (as specified to the kernel 212 or the kernel agent 214) by the code 210, 216 against the operation being contemplated (i.e. as specified/requested in a system call) and also where, in the process memory 201, the instruction(s) that resulted in (or that made/issued) the request for the operation (i.e. the system call) are located. As part of loading the code 210, 216, the kernel 212 or the kernel agent 214 may store, in a table associated with the resulting process, a list of privileges specified by that code 210, 216 for one or more memory regions/portions for the resulting process (i.e. for one or more portions of the process memory 201). A privilege of this second type may (a) specify a particular portion of the process memory 201, such as explicitly specifying a range of one or more addresses (e.g. via a start address and either an end address or a size of the portion) and/or specifying one or more instructions from the code 210, 216 and/or implicitly, by indicating a memory area type, such as "any memory that is both writeable and executable"; and (b) one or more permissions/rights/restrictions. The specified portion of the memory may be, or may comprise, the writeable and executable area of memory 218; alternatively, the specified portion of the memory may be, or may comprise, all of the memory 201 or instructions for the process other than the writeable and executable area of memory 218. The one or more specified permissions may relate to instructions in the specified memory or may relate to all of the memory 201 or instructions for the process other than the specified memory. In this way, a second type of privilege, different from the first type of privilege, may be associated with a portion of memory (such as the portion 218).

As an example, the kernel 212 or the kernel agent 214 may be arranged, upon receiving a system call from a process in which the process requests the execution/creation of another process, to check whether the instruction making the system call is in an area of the memory 201 that has privilege/permission to execute/create another process. This may be done in addition to, or as an alternative to, checking whether the process as a whole has such privilege/permission. If the calling instruction is from an area of the memory 201 for which the specified second type of privilege indicates that "this area of memory can execute/create other processes", then the kernel 212 or the kernel agent 214 will allow that system call (and will therefore carry it out); on the other hand, if the calling instruction is from an area of memory for which the specified second type of privilege indicates that "this area of memory cannot execute/create other processes", then the kernel 212 or the kernel agent 214 will deny that system call (and will therefore not carry it out).

It will be appreciated that different portions of writable and executable memory may have allocated to them different associated "second" privilege types.

In some embodiments, the virtual machine 200 (e.g. the loader 202 and/or the memory manager 208) may be arranged to provide/specify the second type of privilege to the kernel instead of, or in addition to, the second type of privilege originating from the code 210, 216. In this way, the writer/developer of the code 210, 216 does not need to remember to include such a specification of the second type of privilege into the code 210, 216, since the virtual machine 200 can take care of the second type of privilege for him. Similarly, such a virtual machine 200 would then apply such second types of privilege retrospectively to legacy/existing code 210, 216.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, bytecode, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for executing a process on a device, the device comprising one or more processors for executing the process and a memory, wherein the process has an associated first type of privilege, the method comprising:
    obtaining a portion of the memory for use by the process or for use by a further process being created by the process, wherein the portion of the memory is identified as both writable and executable memory, wherein a second type of privilege that is different from the first type of privilege has been associated with the portion of memory;
    wherein the first type of privilege and/or the second type of privilege allows and/or prohibits one or more of:
        (a) opening a file;
        (b) performing one or more predetermined system calls;
        (c) reading a file;
        (d) writing to a file;
        (e) creating a communications connection.

2. The method of claim 1, wherein said obtaining is performed at the run time of the process.

3. The method of claim 1, wherein said obtaining comprises requesting a kernel that is executing on the one or more processors to perform a dynamic memory allocation.

4. The method of claim 3, wherein said requesting specifies to the kernel the second type of privilege, the kernel being arranged to allocate said portion of the memory and to associate the specified second type of privilege to the portion of the memory.

5. The method of claim 3, wherein said requesting does not specify to the kernel the second type of privilege, the kernel being arranged to allocate said portion of the memory and, if said requesting occurs at the run time of the process, to associate the second type of privilege to the portion of the memory.

6. The method of claim 1, wherein said obtaining is performed as part of a just-in-time compiler compiling code for the process into one or more machine language instructions for the just-in-time compiler to store in the portion of the memory.

7. The method of claim 1, wherein the second type of privilege is one or more of:
   (a) more prohibitive that the first type of privilege;
   (b) a predetermined type of privilege;
   (c) determined based, at least in part, on the first type of privilege.

8. The method of claim 1, wherein execution of the process is performed by a virtual machine running on the one or more processors or by an interpreter running on the one or more processors.

9. A method for enabling execution of a process on a device, the device comprising one or more processors for executing the process and a memory, wherein the process has an associated first type of privilege, the method comprising:
   receiving a request for a portion of the memory for use by the process or for use by a further process being created by the process; and
   in response to the request, providing a portion of the memory that is identified as both writable and executable memory, wherein said providing comprises associating a second type of privilege that is different from the first type of privilege with the portion of the memory;
   wherein the first type of privilege and/or the second type of privilege allows and/or prohibits one or more of:
   (a) opening a file;
   (b) performing one or more predetermined system calls;
   (c) reading a file;
   (d) writing to a file;
   (e) creating a communications connection.

10. The method of claim 9, wherein said request is received at the run time of the process.

11. The method of claim 9, wherein said request is a dynamic memory allocation request.

12. The method of claim 11, wherein said dynamic memory allocation request specifies the second type of privilege.

13. The method of claim 9, wherein said receiving and providing are performed by a kernel that is executing on the one or more processors.

14. The method of claim 9, wherein said request is received from a just-in-time compiler when the just-in-time compiler is compiling code for the process into one or more machine language instructions for the just-in-time compiler to store in the requested portion of the memory.

15. The method of claim 9, wherein the second type of privilege is one or more of:
   (a) more prohibitive that the first type of privilege;
   (b) a predetermined type of privilege;
   (c) determined based, at least in part, on the first type of privilege.

16. The method of claim 7, wherein execution of the process is performed by a virtual machine running on the one or more processors by an interpreter running on the one or more processors.

17. An apparatus comprising one or more processors and a memory, the one or more processors arranged to execute a process that has an associated first type of privilege, wherein the one or more processors are arranged to obtain a portion of the memory for use by the process or for use by a further process being created by the process, wherein the portion of the memory is identified as both writable and executable memory, wherein a second type of privilege that is different from the first type of privilege has been associated with the portion of the memory;
   wherein the first type of privilege and/or the second type of privilege allows and/or prohibits one or more of:
   (a) opening a file;
   (b) performing one or more predetermined system calls;
   (c) reading a file;
   (d) writing to a file;
   (e) creating a communications connection.

18. An apparatus comprising one or more processors and a memory, the one or more processors arranged to execute a process that has an associated first type of privilege, wherein the one or more processors are arranged to:
   receive a request for a portion of the memory for use by the process or for use by a further process being created by the process; and
   in response to the request, provide a portion of the memory that is identified as both writable and executable memory, wherein providing the portion of the memory comprises associating a second type of privilege that is different from the first type of privilege with the portion of the memory;
   wherein the first type of privilege and/or the second type of privilege allows and/or prohibits one or more of:
   (a) opening a file;
   (b) performing one or more predetermined system calls;
   (c) reading a file;
   (d) writing to a file;
   (e) creating a communications connection.

19. A method for executing a process on a device, the device comprising one or more processors for executing the process and a memory, wherein the process has an associated first type of privilege, the method comprising:
   obtaining a portion of the memory for use by the process or for use by a further process being created by the process, wherein the portion of the memory is identified as both writable and executable memory, wherein a second type of privilege that is different from the first type of privilege has been associated with the portion of memory;
   wherein said obtaining comprises requesting a kernel that is executing on the one or more processors to perform a dynamic memory allocation, wherein said requesting specifies to the kernel the second type of privilege, the kernel being arranged to allocate said portion of the memory and to associate the specified second type of privilege to the portion of the memory.

20. The method of claim 19, wherein said obtaining is performed at the run time of the process.

21. The method of claim 19, wherein said requesting does not specify to the kernel the second type of privilege, the kernel being arranged to allocate said portion of the memory and, if said requesting occurs at the run time of the process, to associate the second type of privilege to the portion of the memory.

22. The method of claim 19, wherein said obtaining is performed as part of a just-in-time compiler compiling code for the process into one or more machine language instructions for the just-in-time compiler to store in the portion of the memory.

23. The method of claim 19, wherein execution of the process is performed by a virtual machine running on the one or more processors or by an interpreter running on the one or more processors.

24. A method for enabling execution of a process on a device, the device comprising one or more processors for executing the process and a memory, wherein the process has an associated first type of privilege, the method comprising:
  receiving a request for a portion of the memory for use by the process or for use by a further process being created by the process; and
  in response to the request, providing a portion of the memory that is identified as both writable and executable memory, wherein said providing comprises associating a second type of privilege that is different from the first type of privilege with the portion of the memory;
  wherein said request is a dynamic memory allocation request that specifies the second type of privilege.

25. The method of claim 24, wherein said request is received at the run time of the process.

26. The method of claim 24, wherein said receiving and providing are performed by a kernel that is executing on the one or more processors.

27. The method of claim 24, wherein said request is received from a just-in-time compiler when the just-in-time compiler is compiling code for the process into one or more machine language instructions for the just-in-time compiler to store in the requested portion of the memory.

28. The method of claim 24, wherein execution of the process is performed by a virtual machine running on the one or more processors by an interpreter running on the one or more processors.

29. An apparatus comprising one or more processors and a memory, the one or more processors arranged to execute a process that has an associated first type of privilege, wherein the one or more processors are arranged to obtain a portion of the memory for use by the process or for use by a further process being created by the process, wherein the portion of the memory is identified as both writable and executable memory, wherein a second type of privilege that is different from the first type of privilege has been associated with the portion of the memory;
  wherein said obtaining comprises the one or more processors requesting a kernel that is executing on the one or more processors to perform a dynamic memory allocation, wherein said requesting specifies to the kernel the second type of privilege, the kernel being arranged to allocate said portion of the memory and to associate the specified second type of privilege to the portion of the memory.

30. An apparatus comprising one or more processors and a memory, the one or more processors arranged to execute a process that has an associated first type of privilege, wherein the one or more processors are arranged to:
  receive a request for a portion of the memory for use by the process or for use by a further process being created by the process; and
  in response to the request, provide a portion of the memory that is identified as both writable and executable memory, wherein providing the portion of the memory comprises associating a second type of privilege that is different from the first type of privilege with the portion of the memory;
  wherein said request is a dynamic memory allocation request that specifies the second type of privilege.

* * * * *